(12) United States Patent
Nishio et al.

(10) Patent No.: US 8,320,356 B2
(45) Date of Patent: Nov. 27, 2012

(54) WIRELESS COMMUNICATION APPARATUS AND WIRELESS COMMUNICATION METHOD

(75) Inventors: Akihiko Nishio, Kanagawa (JP); Yasuaki Yuda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 977 days.

(21) Appl. No.: 11/912,636

(22) PCT Filed: Apr. 26, 2006

(86) PCT No.: PCT/JP2006/308690
§ 371 (c)(1), (2), (4) Date: Jan. 25, 2008

(87) PCT Pub. No.: WO2006/118124
PCT Pub. Date: Nov. 9, 2006

(65) Prior Publication Data
US 2008/0273517 A1  Nov. 6, 2008

(30) Foreign Application Priority Data

Apr. 28, 2005 (JP) ................................ 2005-133721

(51) Int. Cl.
*H04J 3/00* (2006.01)
*H04L 12/28* (2006.01)
(52) U.S. Cl. ................................ 370/345; 370/395.21
(58) Field of Classification Search .................. 370/204, 370/208, 210, 310
See application file for complete search history.

(56) References Cited

U.S. PATENT DOCUMENTS

| 5,872,774 | A | * | 2/1999 | Wheatley et al. ............. 370/335 |
| 6,208,871 | B1 | * | 3/2001 | Hall et al. ...................... 455/517 |
| 6,344,821 | B2 | * | 2/2002 | Norimatsu .................... 342/387 |
| 6,526,039 | B1 | * | 2/2003 | Dahlman et al. .............. 370/350 |
| 7,424,009 | B2 | * | 9/2008 | Mottier ......................... 370/355 |
| 2002/0075978 | A1 | * | 6/2002 | Dick et al. .................... 375/356 |
| 2003/0152178 | A1 | | 8/2003 | Tanno et al. |

(Continued)

FOREIGN PATENT DOCUMENTS

JP        06334573        12/1994

(Continued)

OTHER PUBLICATIONS

International Search Report dated Jul. 26, 2006.

(Continued)

*Primary Examiner* — Warner Wong
(74) *Attorney, Agent, or Firm* — Dickinson Wright PLLC

(57) ABSTRACT

The circuit scale of a wireless communication apparatus at the data receiving end in a wireless communication performing an adaptive control for each of subcarriers or subchannels can be reduced. In the present apparatus, frame forming parts (103-1 to 103-m) each multiplex a pilot, control information and transport data to form a frame for a respective one of subchannels (1 to m). A subcarrier assigning part (104) assigns subcarriers designated from an adaptive control part (114) to the respective frames formed by the frame forming parts (103-1 to 103-m). A timing control part (105) establishes mutually different frame timing offsets to the respective frames received from the subcarrier assigning part (104).

6 Claims, 7 Drawing Sheets

U.S. PATENT DOCUMENTS

| | | | |
|---|---|---|---|
| 2004/0001429 A1* | 1/2004 | Ma et al. .................. | 370/210 |
| 2004/0032836 A1* | 2/2004 | Grilli et al. ................ | 370/252 |
| 2004/0085946 A1 | 5/2004 | Morita et al. | |
| 2005/0058104 A1 | 3/2005 | Yomo et al. | |
| 2005/0063327 A1* | 3/2005 | Krauss et al. ............. | 370/320 |
| 2006/0188007 A1* | 8/2006 | Daneshrad et al. ........ | 375/148 |
| 2006/0203850 A1* | 9/2006 | Johnson et al. ............ | 370/503 |
| 2007/0177631 A1* | 8/2007 | Popovic et al. ............ | 370/478 |
| 2009/0149169 A1* | 6/2009 | Tanno et al. .............. | 455/422.1 |

FOREIGN PATENT DOCUMENTS

| | | |
|---|---|---|
| JP | 2001103029 | 4/2001 |
| JP | 200216577 | 1/2002 |
| JP | 2003179522 | 6/2003 |
| JP | 2003244763 | 8/2003 |
| JP | 2005117625 | 4/2005 |

OTHER PUBLICATIONS

H. Harada, et al. "Dynamic Parameter Controlled OF/TDMA ni yoru Shinsedai Ido Tsushin System," IEICE Technical Report, Jan. 9, 2004, vol. 103, No. 553, pp. 41-46.

S. Nagata, et al. "Kudari Link Spread OFDM Broadband Packet Musen Access ni Okeru Shuhasu Packet Scheduling no Koka," IEICE Technical Report, Nov. 12, 2004, vol. 104, No. 440, pp. 31-36.

* cited by examiner

WIRELESS COMMUNICATION APPARATUS AND WIRELESS COMMUNICATION METHOD

TECHNICAL FIELD

The present invention relates to a wireless communication apparatus and wireless communication methods.

BACKGROUND ART

Looking toward next-generation mobile communication systems, various studies have been conducted on radio transmission schemes suitable for high-speed packet transmissions, to achieve data rates over 100 Mbps and low delay transmissions to accommodate various traffics.

OFDM (Orthogonal Frequency Division Multiplexing), whereby data is transmitted in parallel using a large number of subcarriers, is becoming a focus of attention in recent years, as a transmission scheme that enables high-speed transmission in a multipath communication environment. Moreover, to achieve low delay transmissions, the use of short TTI's (Transmission Time Intervals) of approximately 0.5 ms, for example, has been studied (see, for example, non-patent document 1). In OFDM, a wireless communication base station apparatus (hereinafter simply "base station") performs adaptive control including scheduling and adaptive modulation of transmission packets in TTI units, per subcarrier or per subchannel bundling a plurality of subcarriers. By this means, throughput can be significantly improved.

Non-patent Document 1: "Effect of Frequency-domain Packet Scheduling in Forward Link Spread OFDM Broadband Packet Wireless Access" Nagata et al, Technical Report of IEICE, RCS2004-228, November 2004.

DISCLOSURE OF INVENTION

Problems to be Solved by the Invention

When adaptive control such as scheduling and adaptive modulation is performed, prior to data packet transmissions, control information including scheduling information and modulation parameters is transmitted from the base station. This control information needs to be transmitted just before the data packet transmission, to make adaptive modulation follow channel variations changing at high speed. A wireless communication mobile station apparatus (hereinafter simply "mobile station") demodulates and decodes data packets using modulation parameters for data packets acquired by demodulating and decoding the control information. Moreover, to implement low delay transmission, a mobile station needs to transmit responses such as ACK (ACKnowledgement) or NACK (Negative ACKnowledgement) for received data packets in a short time period (within several TTI's, for example).

Here, when adaptive control is performed per subcarrier or per subchannel as described above, a large volume of control information and a large number of data packets are necessarily transmitted. Consequently, a mobile station needs to perform processing for receiving many data packets at the same time, within a limited time. As a result, circuit scale of the mobile station is increased.

It is therefore an object of the present invention to provide a wireless communication apparatus and a wireless communication method that make it possible to reduce circuit scale of the wireless communication apparatus of the data receiving side.

Means for Solving the Problem

The wireless communication apparatus of the present invention employs a configuration having: a wireless communication apparatus dividing a plurality of subcarriers forming a multicarrier signal into a plurality of subchannels and performing adaptive control per subchannel, the wireless communication apparatus comprising: a timing setting section that sets different transmission timings for the plurality of subchannels; and a transmitting section that transmits the multicarrier signal including the plurality of subchannels after the transmission timing setting.

ADVANTAGEOUS EFFECT OF THE INVENTION

According to the present invention, it is possible to reduce circuit scale of wireless communication apparatus of the data receiving side.

BEST MODE FOR CARRYING OUT THE INVENTION

Embodiments of the present invention will be explained below in detail with reference to the accompanying drawings.

(Embodiment 1)

Figure 1:
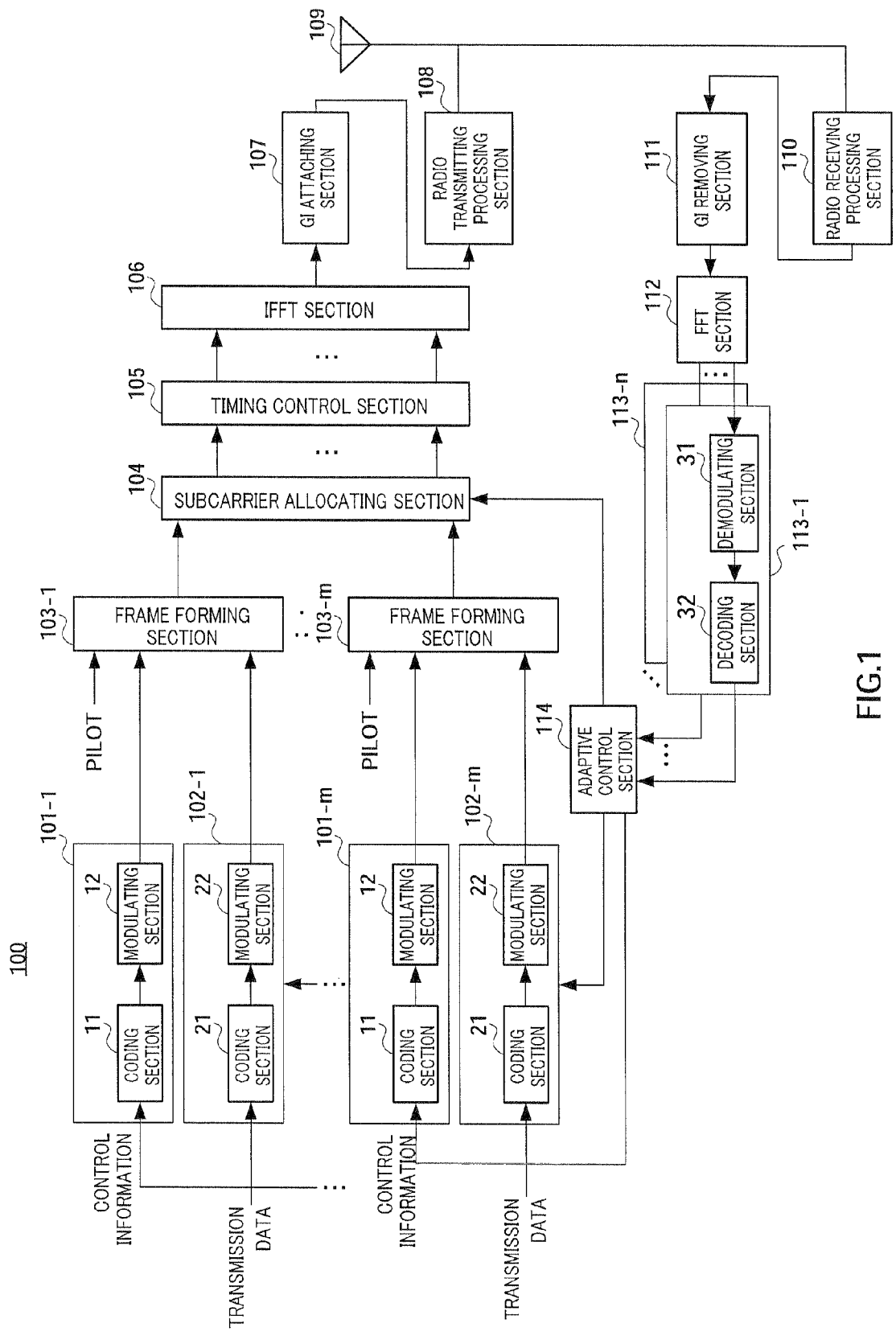
FIG. 1 is a block diagram showing a configuration of a wireless communication apparatus according to Embodiment 1 of the present invention.

FIG. 1 shows the configuration of wireless communication apparatus 100 according to this embodiment. Wireless communication apparatus 100 divides a plurality of subcarriers forming an OFDM symbol, which is a multicarrier signal, into a plurality of subchannels, and performs adaptive control including scheduling and adaptive modulation per subchannel. In this connection, in the following description, a case will be explained where wireless communication apparatus 100 is provided in a base station used in a mobile communication system.

In wireless communication system 100, control channel coding and modulating sections 101-1 to 101-$m$, each comprised of coding section 11 and modulating section 12, data channel coding and modulating sections 102-1 to 102-$m$, each comprised of coding section 21 and modulating section 22, and frame forming sections 103-1 to 103-$m$, are all provided to equal m, the number of subchannels. In addition, demodulating and decoding sections 113-1 to 113-$n$, each comprised of demodulating section 31 and decoding section 32, are provided to equal n, the number of mobile stations wireless communication apparatus 100 is able to communicate with.

In coding and modulating sections 101-1 to 101-$m$, coding section 11 performs encoding processing on control information that is outputted from adaptive control section 114 per subchannel, and modulating section 12 performs modulation processing on the control information after encoding. Control information is necessary to perform adaptive control and includes MCS (Modulation and Coding Scheme) information, which designates the modulation scheme and the coding rate for transmission data per subchannel, and allocation information, which shows to which subcarriers each transmission data is assigned. Incidentally, the coding rate in encoding section 11 and the modulation scheme in modulation section 12 are determined in advance.

In coding and modulating sections 102-1 to 102-m, encoding section 21 performs encoding processing on transmission data of each subchannel and modulation section 22 performs modulation processing on the transmission data after encoding using modulation schemes including QPSK and 16QAM. The coding rate and modulation scheme are in accordance with MCS information inputted from adaptive control section 114.

Frame forming sections 103-1 to 103-m multiplex a pilot, control information and transmission data upon subchannels 1 to m, respectively, and form frames. That is, frame forming sections 103-1 to 103-m multiplex a pilot channel, a control channel and a data channel upon subchannels 1 to m. Here, frame forming sections 103-1 to 103-m time-multiplex the pilot channel, control information and transmission data, in order.

Subcarrier allocating section 104 allocates the subcarriers designated by adaptive control section 114, to frames formed in frame forming sections 103-1 to 103-m.

Timing control section 105 sets different frame timing offsets to frames (i.e. a plurality of frames formed for each subchannel 1 to m) inputted from subcarrier allocating section 104. That is, timing control section 105 performs timing control of setting different transmission timings between subchannels 1 to m. By this control, frames of differing subchannels are inputted to IFFT (Inverse Fast Fourier Transform) section 106, in parallel, at different timings.

IFFT section 106 performs IFFT on the frames allocated to the subcarriers after the timing control and acquires an OFDM symbol.

GI attaching section 107 attaches the same signal as the tail part of an OFDM symbol, to the beginning of that OFDM symbol, to provide a guard interval ("GI").

Radio transmitting processing section 108 performs transmission processing including D/A conversion, amplification and up-conversion, on the OFDM symbol with an attachment of a GI, and transmits the result from antenna 109 to a mobile station. That is, radio transmitting processing section 108 transmits an OFDM symbol including subchannels 1 to m, each set with a different transmission timing, to a mobile station.

In this way, wireless communication system 100 performs adaptive control per subchannel bundling a plurality of subcarriers, and performs data transmission.

On the other hand, radio receiving processing section 110 receives n OFDM symbols, transmitted from a maximum of n mobile stations at the same time via antenna 109, and performs receiving processing including down-conversion and D/A conversion, on these OFDM symbols.

GI removing section 111 removes the GI from the OFDM symbol after the receiving processing.

FFT (Fast Fourier Transform) section 112 performs FFT on the OFDM symbol after the GI removal and acquires the mobile station-specific signals multiplexed in the frequency domain. Here, mobile stations transmit signals using different subcarriers or different subchannels, and the mobile station-specific signals include received quality information reported from each mobile station. Besides, each mobile station is able to measure received quality of each subchannel, from, for example, the received SNR, received SIR, received CINR, received power, interference power, bit error rate, throughput, MCS that achieves a predetermined error rate, and so on. In addition, received quality information may be referred to as "CQI" (Channel Quality Indicator) or "CSI" (Channel State Information), for example.

In demodulating and decoding sections 113-1 to 113-n, demodulating section 31 performs demodulation processing on the signal after FFT and performs decoding on processing the signal after demodulation. By this means, received data is acquired. In addition, received quality information of each subchannel in received data, is inputted to adaptive control section 114.

Adaptive control section 114 performs adaptive control, based on received quality information for each subchannel reported from the mobile stations. That is, based on received quality information per subchannel, adaptive control section 114 selects MCS that can achieve the required error rate (MCS selection) per subcarrier, and outputs MCS information to coding and modulating sections 102-1 to 102-m. Adaptive control section 114 also performs on each of the subchannels, frequency scheduling that determines to which subcarriers each transmission data is allocated, using scheduling algorithms such as the maximum SIR method and the proportional fairness method. Further, adaptive control section 114 generates control information including MCS information and allocation information, per subchannel, and outputs each control information to the corresponding one of coding and modulating sections 101-1 to 101-m.

Figure 2:
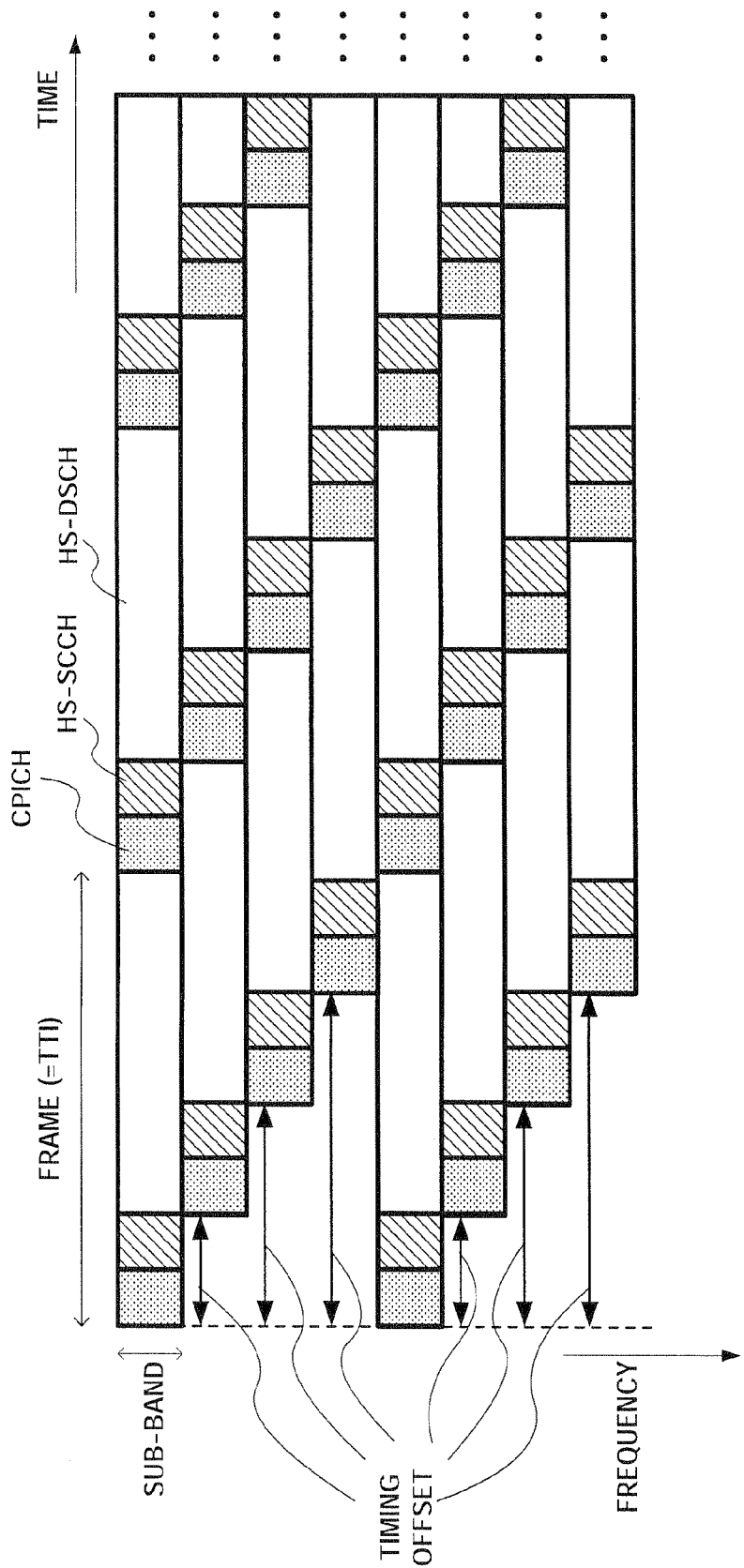
FIG. 2 illustrates timing control according to Embodiment 1 of the present invention.

When the above timing control is performed on frames of differing subchannels, as shown in FIG. 2, a different timing offset is set per subchannel. For this reason, m frames (in FIG. 2, m=8) that have conventionally been transmitted at the same timing, are transmitted at different timings. Consequently, if a plurality of subchannels is allocated to one mobile station, the CPICH (Common Pilot Channel), HS-SCCH (Shared Control Channel for HS-DSCH) and HS-DSCH (High Speed Downlink Shared Channel) of each subchannel are received at a different timing of an interval of the timing offset at that mobile station. Furthermore, in FIG. 2, the number of subchannels m is 8, and the timing offset is ¼ frame per subchannel. That is, in FIG. 2, the same transmission timings are repeated every four subchannels. The CPICH is the channel for the pilot, the HS-SCCH is the channel for the above control information and the HS-DSCH is the channel for transmission data.

Figure 3:
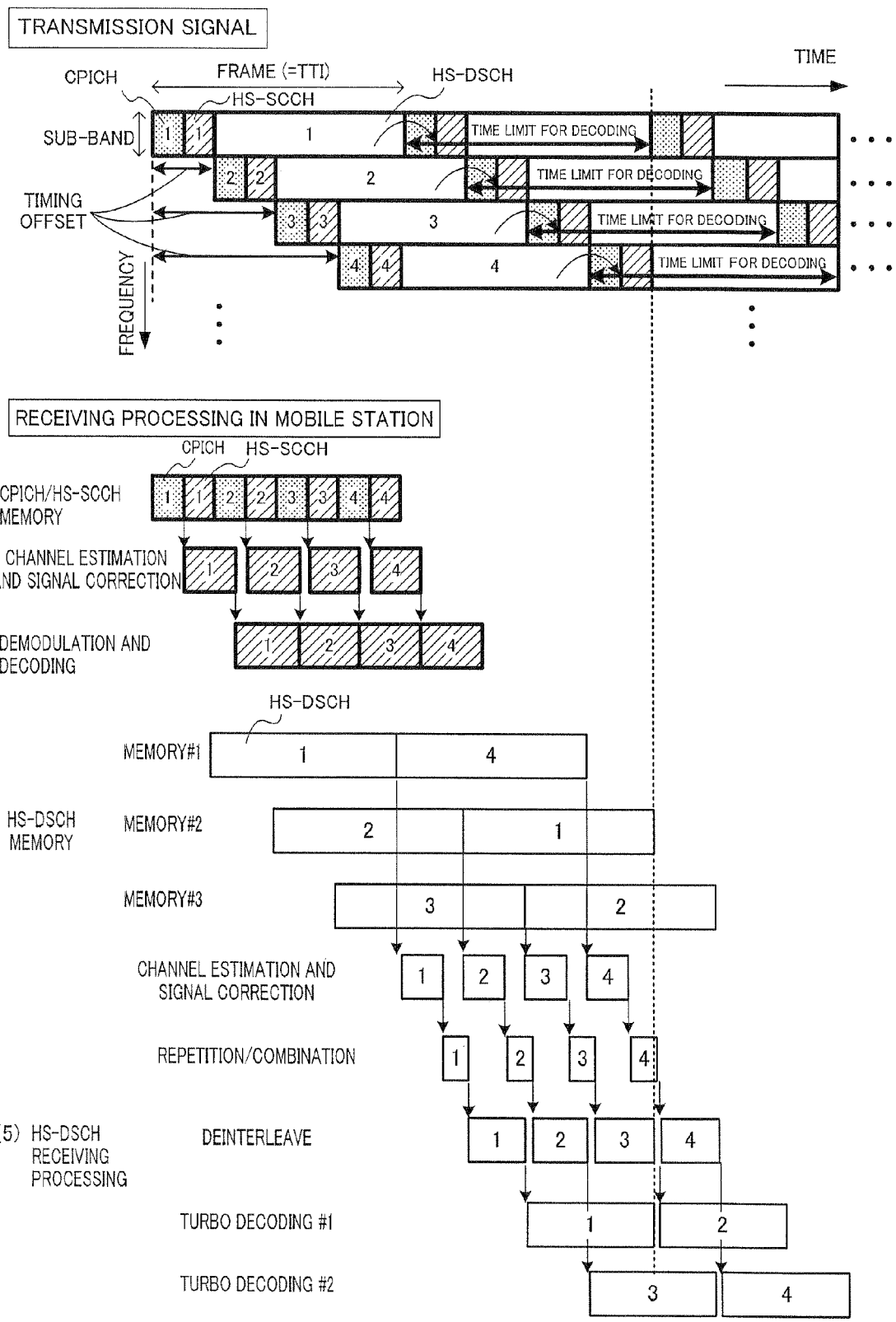
FIG. 3 illustrates receiving processing at a mobile station according to Embodiment 1 of the present invention.

If the CPICH, HS-SCCH and HS-DSCH of different subchannels are received at different timings at a mobile station, the mobile station will be able to perform receiving processing as follows. The receiving processing in the mobile station will be explained below using FIG. 3. Further, for ease of explanation, in FIG. 3, the transmission signal from a base station will be shown as four subchannels. In addition, to fulfill the delay requirement, it is assumed that the data of each subchannel needs to be finished being decoded within one TTI after the data is received at the mobile station.

The mobile station successively performs the following processing for every subchannels 1 to 4. That is, when the baseband signal is received, the mobile station stores the pilot channel (CPICH) and control information (HS-SCCH) in a memory (processing (1)). After having received the pilot channel and control information, the mobile station performs channel estimation and signal correction for the control information using channel estimation values (processing (2)). Next, the mobile station demodulates and decodes the corrected control information (processing (3)). Here, each subchannel has a different frame timing, so that it is enough to provide only one circuit (hardware) per processing (1) to (3), to perform the series of processing (1) to (3).

Next, the mobile station successively stores the data (HS-DSCH) in memory #1 to #3 (processing (4)). Every time data is stored in a memory, the mobile station performs receiving processing on the data in accordance with MCS information included in demodulated control information (processing (5)). In processing (5), the mobile station first performs signal correction on data using channel estimation values. Secondly, the mobile station performs repetition and symbol combination of the data. Next, the mobile station deinterleaves the data. Then, the mobile station performs turbo decoding on the data. Here, to finish decoding within one TTI, which is the time limit for decoding, two decoding circuits #1 and #2 are used for turbo decoding. That is, processing (4) requires three memories, and processing (5) requires only one channel estimation circuit, signal correction circuit, repetition combination circuit, and deinterleaving circuit and two turbo decoding circuits.

On the other hand, when all subchannels are transmitted from a base station at the same timing, as in related art, in order to finish decoding within a time limit of one TTI, processing (1) to (3) requires four circuits per processing, and processing (5) requires four channel estimation circuits, signal correction circuits, repetition combination circuits and deinterleaving circuits.

In this way, according to the present embodiment, a mobile station receives frames of different subchannels at different timings, so that it is possible to perform receiving processing for a large number of frames at different timings. Consequently, circuit scale can be reduced.

Further, received quality information for each subchannel is fed back from the mobile station to the base station on uplink. As in related art, when all subchannels are transmitted from a base station at the same timing, to synchronize the control delay in adaptive control for all subchannels, received quality information also needs to be fed back at the same time for all subchannels. However, according to the present embodiment, the frame timing varies per subchannel, so that the feedback timing for received quality information also varies per subchannel. The present embodiment thus prevents concentration of uplink feed back information in time, so that the interference which the feed back information causes against uplink data can be reduced. In addition, when a mobile station multiplexes a significant volume of feed back information and transmits the result all at the same time, the maximum required transmission power increases. Consequently, as explained above, each feedback information is transmitted at a different timing. By this means, the maximum required transmission power can be reduced.

In this way, according to the present embodiment, by transmitting frames of different subchannel at different timing by a base station which is a wireless communication apparatus of the data transmitting side, circuit scale of a mobile station which is a wireless communication apparatus of the data receiving side can be reduced.

(Embodiment 2)

According to this embodiment, transmission power control is performed on frames in each subchannel. In addition, according to the present embodiment, different frame timings are set per cell.

Figure 4:
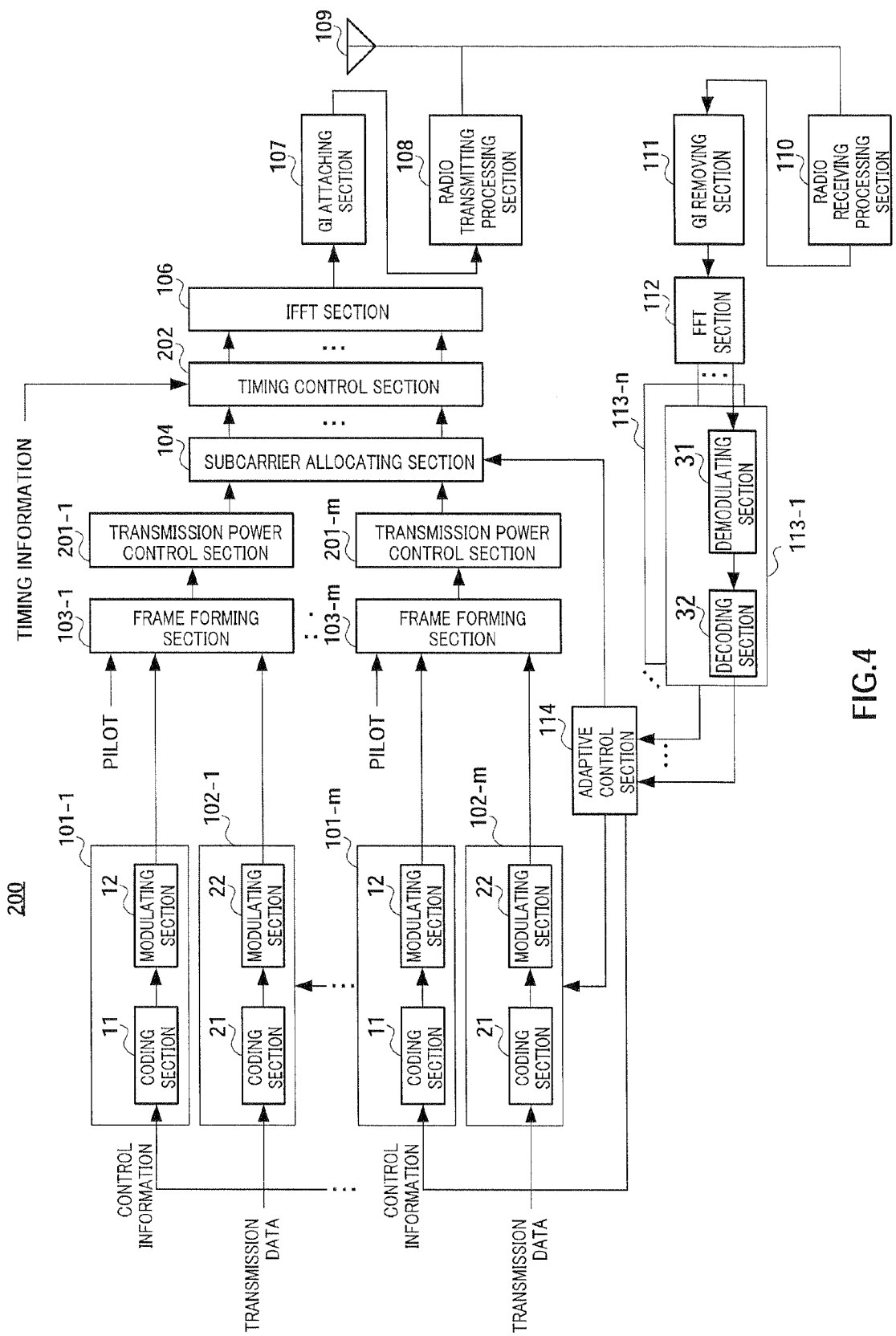
FIG. 4 is a block diagram showing the configuration of the wireless communication apparatus according to Embodiment 2 of the present invention.

FIG. 4 shows the configuration of wireless communication apparatus 200 according to the present embodiment. In FIG. 4, the same reference numerals are assigned to the same parts as in Embodiment 1 (FIG. 1) and explanations thereof will be omitted.

In wireless communication apparatus 200, transmission power control sections 201-1 to 201-$m$ are provided to equal the number of subchannels m, and control the transmission power of the pilot channel (CPICH), control information (HS-SCCH) and transmission data (HS-DSCH) of each frame inputted from frame forming sections 103-1 to 103-$m$. Transmission power control sections 201-1 to 201-$m$ set transmission power, such that, for example, the CPICH:HS-SCCH:HS-DSCH power ratio is 2:2:1. That is, transmission power control sections 201-1 to 201-$m$ set the transmission power of the pilot channel greater than the transmission power of the data channel. In addition, transmission power control sections 201-1 to 201-$m$ set the transmission power of the control channel greater than the transmission power of the data channel.

Figure 5:
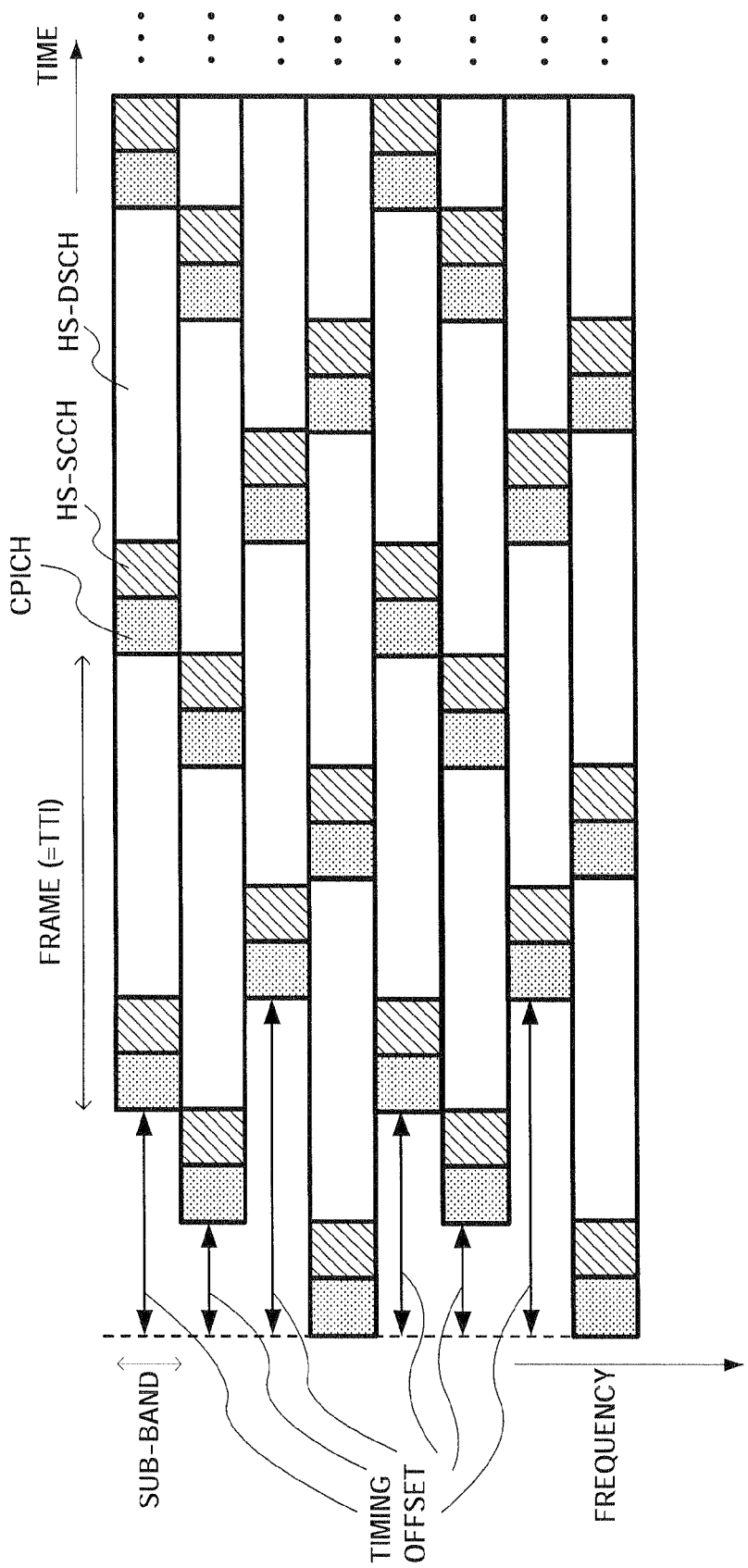
FIG. 5 illustrates timing control according to Embodiment 2 of the present invention.

Timing control section 202 receives as input timing information designated from a radio network controller (RNC), and performs the above timing control according to this timing information. This timing information designates a different frame timing offset per cell. That is, timing control section 202 sets transmission timings for each frame a timing that is different from transmission timings set in neighboring cells. By this timing control, for example, with wireless communication apparatus 200 in cell 1, timing offsets are set as shown in FIG. 2 above, and, with wireless communication 200 apparatus in cell 2, which neighbors cell 1, timing offsets are set as shown in FIG. 5. In this way, according to the present embodiment, the subchannel-specific timing offsets vary between cells, so that it is possible to prevent a pilot transmission timing in one cell from overlapping with a pilot transmission timing in another, neighboring cell. As a result, at a mobile station located near a cell boundary, it is possible to prevent the pilots from interfering each other. Consequently, by preventing interference between pilots, at the mobile station, the accuracy of channel estimation improves, and, as a result, throughput improves.

Figure 6:
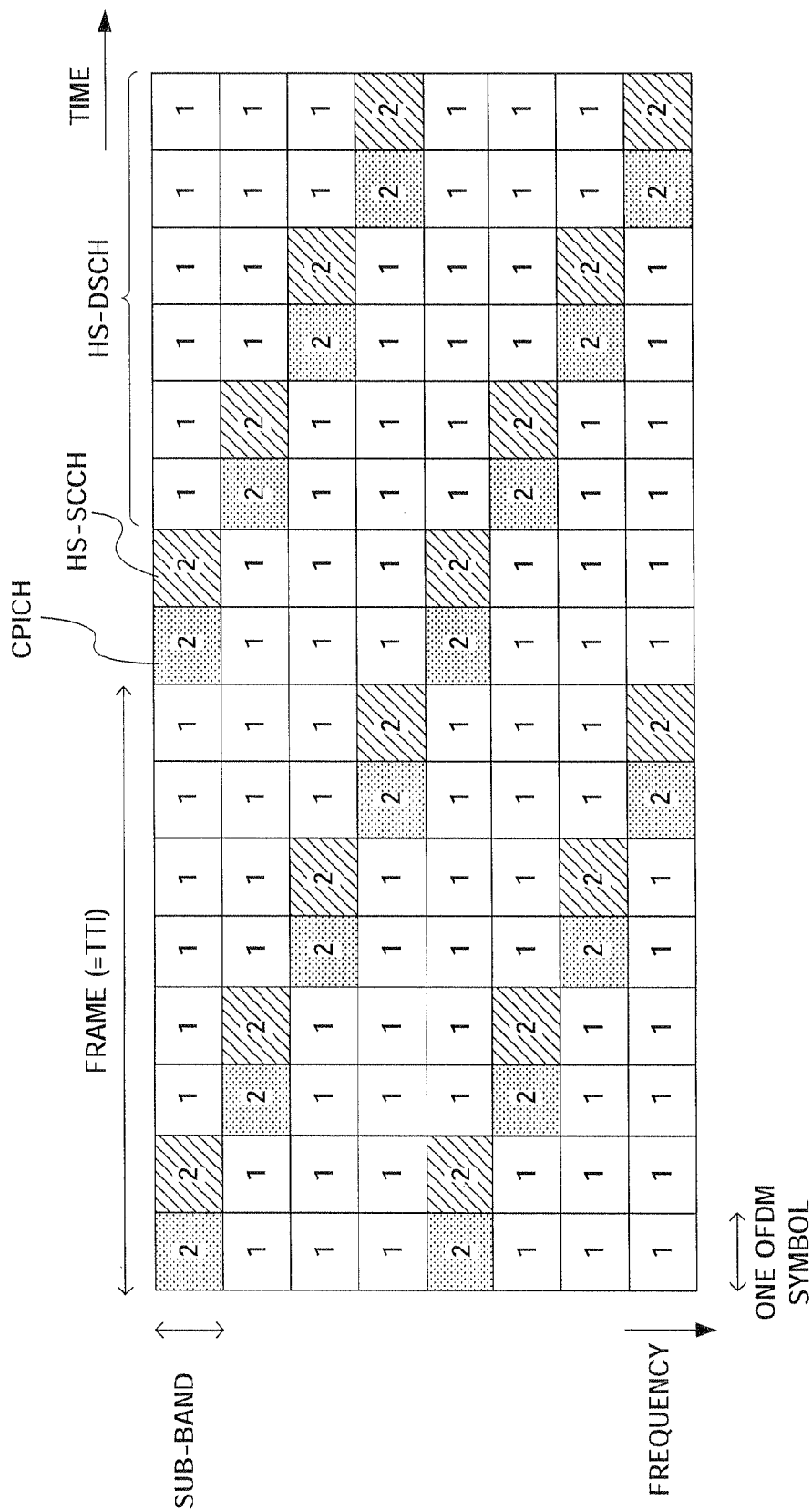
FIG. 6 illustrates transmission power control according to Embodiment 2 of the present invention.
Figure 7:
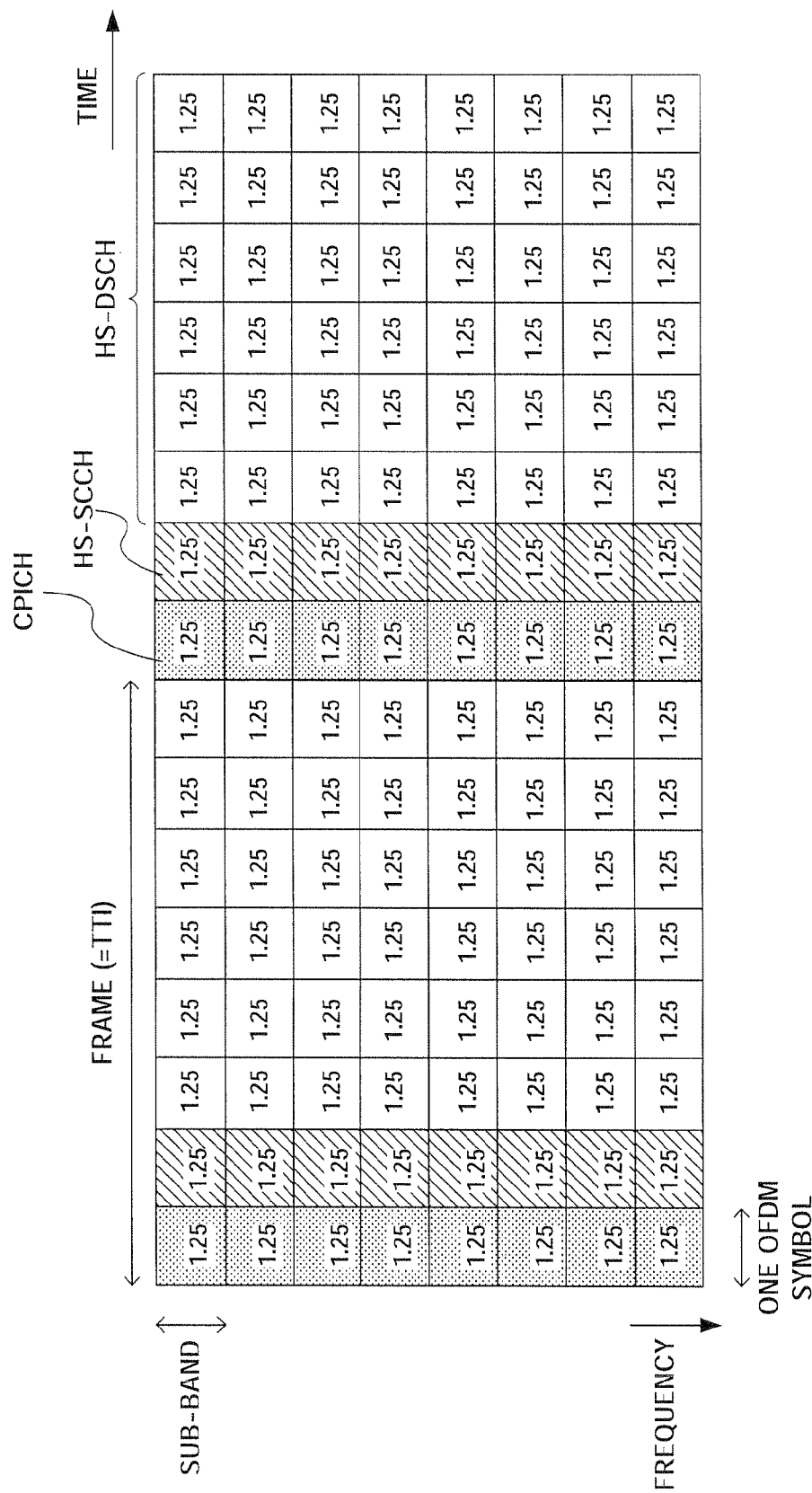
FIG. 7 illustrates conventional transmission power control.

Here, the above transmission power control will be explained in detail using FIG. 6, and explained in comparison with conventional transmission power control (FIG. 7). In addition, in FIGS. 6 and 7, the numerals show transmission power values. Furthermore, in both FIG. 6 and FIG. 7, the maximum power (total transmission power) per OFDM symbol is 10.

According to the present embodiment, frame timing offsets vary between subchannels. For this reason, if the total transmission power is 10 and one OFDM symbol is comprised of eight subchannels, as shown in FIG. 6, as explained above, the CPICH:HS-SCCH:HS-DSCH power ratio can be set 2:2:1, for example. That is, the transmission power of the HS-DSCH can be set as 1, while the transmission power of the CPICH is 2 and the transmission power of the HS-SCCH is 2.

However, in related art without such transmission power control, the CPICH:HS-SCCH:HS-DSCH power ratio is 1:1:1. Consequently, if the total transmission power is 10 and one OFDM symbol is comprised of eight subchannels, as shown in FIG. 7, the transmission power of the CPICH, the transmission power of the HS-SCCH and the transmission power of the HS-DSCH all need to be set as 1.25.

Here, to demodulate data without error at the mobile station, channel estimation with high accuracy is required. When channel estimation accuracy is low, even if received power of data is large, error rate increases. That is, under the condition where the total transmission power is fixed, as in the present embodiment, by setting the transmission power of the pilot (CPICH) for performing channel estimation greater than the transmission power of data (HS-DSCH), the error rate decreases, and, as a result, throughput improves.

In addition, for the HS-SCCH, adaptive modulation is not performed and the modulation scheme and the coding rate are fixed, and, in addition, retransmission by HARQ (Hybrid Automatic Repeat Request) is not performed. As a result, according to the present embodiment, the transmission power of the HS-SCCH needs to be set greater than the transmission power of the HS-DSCH. In addition, if the transmission power of the HS-SCCH is not enough and control information is in error, data cannot be correctly decoded, and, in addition, HARQ gain for data cannot be acquired, and as a result throughput decreases significantly. As a result, as in the present embodiment, the transmission power of the HS-SCCH is made greater than in related art.

Furthermore, even with related art, it is possible to set the CPICH:HS-SCCH:HS-DSCH power ratio to 2:2:1. However, when all subchannels are transmitted at the same timing as in related art, as shown in FIG. 7, the CPICH and HS-SCCH of every subchannel are transmitted at the same timing. That is, under the condition where the total transmission power is 10 and fixed, when one OFDM symbol is comprised of eight subchannels, if the transmission power of the CPICH and the HS-SCCH is 1.25, the transmission power of the HS-DSCH is decreased to 1.25/2. As a result, the data error rate increases and throughput decreases.

Consequently, the frame timing varies per subchannel, that is, the transmission timings for the pilot channel, the control channel, and the data channel vary per subchannel, so that, under the condition where total transmission power is fixed, the present embodiment can set the above-described power ratio at which error rate characteristics become optimal between the pilot channel, the control channel and the data channel, thereby improving throughput. In other words, transmission power ratio can be set so as to maintain the total transmission power and to minimize the required transmission power achieving the required error rate.

Furthermore, the wireless communication apparatus according to the above embodiments may be provided in mobile stations.

In addition, although cases have been described with the above embodiments where signals received at the base station (i.e., signals that mobile station transmits on uplink) are transmitted in the OFDM scheme, these signals may be transmitted using other transmission schemes including single carrier schemes and CDMA schemes.

Moreover, although configurations have been described with the above embodiments where timing control sections 105 and 202 are provided after subcarrier allocation section 104, timing control sections 105 and 202 may be provided before subcarrier allocation section 104 as well.

Moreover, although cases have been described with the above embodiments where the present invention is applied to subchannels the present invention may be applied to subcarriers as well. That is to say, it is equally possible to set different transmission timings for a plurality of subcarriers in a wireless communication apparatus performing adaptive control per subcarrier.

Moreover, although cases have been described with the above embodiments where a different timing offset is set on a per frame basis, it is equally possible to set a different timing offset on a per subframe basis or on a per slot basis.

Moreover, although cases have been described with the above embodiments where a subchannel is comprised of consecutive subcarriers, a subchannel may as well be comprised of nonconsecutive subcarriers. Moreover, a subchannel may be referred to as a "subcarrier block", a "sub-band," or a "chunk".

Moreover, the mobile station may be referred to as "UE", the base station apparatus may be referred to as "Node-B", and the subcarrier may be referred to as a tone.

Moreover, as for adaptive control, besides scheduling and adaptive modulation, adaptive transmission power control, adaptive spreading factor control and so on may be employed. In addition, for adaptive control, combinations of them, or any one of them may be performed.

Moreover, besides the CPICH, according to 3GPP standards, the pilot channel includes the P-CPICH (Primary Common Pilot Channel), the S-CPICH (Secondary Common Pilot Channel) and the dedicated pilot channel in the DPCCH (Dedicated Physical Control Channel).

Moreover, besides the HS-SCCH, according to 3GPP standards, the control channel includes the DCCH (Dedicated Physical Control Channel), the P-CCPCH (Primary Common Control Physical Channel), the S-CCPCH (Secondary Common Control Physical Channel), and the DPCCH (Dedicated Physical Control Channel).

Moreover, besides the HS-DSCH, according to 3GPP standards, the data channel includes the DSCH (Downlink Shared Channel), the DPCH (Dedicated Physical Channel), and the DCH (Dedicated Channel).

For example, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-133721, filed on Apr. 28, 2005, the entire content of which is expressly incorporated by reference herein.

Industrial Applicability

The present invention is applicable, for example, to mobile communication systems.

The invention claimed is:
1. A wireless communication apparatus dividing a plurality of subcarriers forming a multicarrier signal into a plurality of subchannels and performing adaptive control per subchannel, the wireless communication apparatus comprising:
    a timing setter configured to set different transmission timings for the plurality of subchannels in accordance with a subchannel-specific timing offset which varies between cells; and a transmitter configured to transmit the multicarrier signal including the plurality of subchannels after the transmission timing setting, wherein the timing setter, in order to set the different transmission timings from transmission timings set by a wireless communication apparatus in a neighboring cell, sets a timing offset corresponding to at least a first subchannel of the plurality of subchannels to be longer than a timing offset of at least a first corresponding subchannel in the neighboring cell and sets a timing offset corresponding to a second subchannel of the plurality of subchannels which is different from the first subchannel to be shorter than a timing offset of a second corresponding subchannel in the neighboring cell.

2. The wireless communication apparatus according to claim 1, further comprising:

a multiplexer configured to multiplex a pilot channel and a data channel upon each subchannel; and a power setter configured to set a transmission power for the pilot channel greater than a transmission power for the data channel.

3. The wireless communication apparatus according to claim 1, further comprising:

a multiplexer configured to multiplex a control channel and a data channel upon each subchannel; and a power setter configured to set a transmission power for the control channel greater than a transmission power for the data channel.

4. A wireless communication base station apparatus comprising the wireless communication apparatus according to claim 1.

5. A wireless communication mobile station apparatus comprising the wireless communication apparatus according to claim 1.

6. A wireless communication method of dividing a plurality of subcarriers forming a multicarrier signal into a plurality of subchannels and performing adaptive control per subchannel, the method comprising:

setting different transmission timings for the plurality of subchannels in accordance with a subchannel-specific timing offset which varies between cells; and transmitting the multicarrier signal including the plurality of subchannels after the transmission timing setting, wherein the operation of setting different transmission timings comprises, in order to set the different transmission timings from transmission timings set by a wireless communication apparatus in a neighboring cell, setting a timing offset corresponding to at least a first subchannel of the plurality of subchannels to be longer than a timing offset of at least a first corresponding subchannel in the neighboring cell and setting a timing offset corresponding to a second subchannel of the plurality of subchannels which is different from the first subchannel to be shorter than a timing offset of a second corresponding subchannel in the neighboring cell.

* * * * *